United States Patent
Qian et al.

(10) Patent No.: US 11,669,147 B2
(45) Date of Patent: Jun. 6, 2023

(54) DYNAMIC POWER CONSUMPTION MANAGEMENT AND WAKE-UP METHOD AND APPLICATION SYSTEM THEREFOR

(71) Applicants: Mettler-Toledo (Changzhou) Measurement Technology Co., Ltd., Changzhou (CN); Mettler-Toledo (Changzhou) Precision Instruments Co., Ltd., Changzhou (CN); Mettler-Toledo International Trading (Shanghai) Co., Ltd., Shanghai (CN)

(72) Inventors: ShenJian Qian, Changzhou (CN); Bo Shen, Changzhou (CN); Jianke Liu, Changzhou (CN); Yong Yang, Changzhou (CN)

(73) Assignees: Mettler-Toledo (Changzhou) Measurement Technology Co., Ltd., Changzhou (CN); Mettler-Toledo (Changzhou) Precision Instruments Co., Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 222 days.

(21) Appl. No.: 16/571,276

(22) Filed: Sep. 16, 2019

(65) Prior Publication Data
US 2020/0089309 A1  Mar. 19, 2020

(30) Foreign Application Priority Data

Sep. 17, 2018  (CN) .......................... 201811082328.7

(51) Int. Cl.
*G06F 1/32* (2019.01)
*G06F 1/3246* (2019.01)
(Continued)

(52) U.S. Cl.
CPC .......... *G06F 1/3246* (2013.01); *G06F 1/3206* (2013.01); *G06F 1/3287* (2013.01)

(58) Field of Classification Search
CPC .. G01G 23/3735; G01G 23/3728; G06F 1/32; G06F 1/3206; G06F 1/3246; G06F 1/3287
See application file for complete search history.

(56) References Cited

U.S. PATENT DOCUMENTS

| 6,373,237 | B1 | 4/2002 | Oldendorf et al. |
| 3,041,974 | A1 | 10/2011 | Lin et al. |

(Continued)

FOREIGN PATENT DOCUMENTS

| CN | 102419200 A | 4/2012 | |
| CN | 105488989 A | 4/2016 | |
| WO | WO-2016022941 A1 * | 2/2016 | ........... A61B 5/0205 |

*Primary Examiner* — Mark A Connolly
(74) *Attorney, Agent, or Firm* — Standley Law Group LLP; Jeffrey S. Standley; Adam J. Smith

(57) ABSTRACT

A method for dynamically managing power consumption, as well as a wake-up method, is disclosed for a wireless weighing platform. The method is initialized by setting both light and deep sleep period, entering a normal operating state, and starting light sleep timing. As long as no weighing operation is detected and the light sleep period has not expired, the method seeks to detect the weighing operation. If the light sleep period expires with no weighing operation, a light sleep state is entered, by turning off a communication function and starting timing for the deep sleep period. If no weighing is when the deep sleep period has expired, the wireless weighing platform enters a deep sleep state, by turning off power supply other than that for an acceleration sensor. If the acceleration sensor detects an effective vibration while in the deep sleep state, the normal operating state is restarted.

10 Claims, 2 Drawing Sheets

(51) Int. Cl.
G06F 1/3287 (2019.01)
G06F 1/3206 (2019.01)

(56) References Cited

U.S. PATENT DOCUMENTS

| | | | | |
|---|---|---|---|---|
| 8,850,251 | B1* | 9/2014 | Maeng | G06F 1/3234 |
| | | | | 713/323 |
| 2006/0053315 | A1* | 3/2006 | Menzl | H04N 1/00928 |
| | | | | 713/300 |
| 2008/0111698 | A1* | 5/2008 | Atherton | G06F 1/3215 |
| | | | | 340/601 |
| 2013/0166932 | A1* | 6/2013 | Iarovici | G06F 1/3231 |
| | | | | 713/323 |
| 2013/0278081 | A1* | 10/2013 | Chien | G06F 1/3206 |
| | | | | 307/121 |
| 2014/0257741 | A1* | 9/2014 | Chupp | G01G 23/3728 |
| | | | | 702/173 |
| 2014/0344599 | A1* | 11/2014 | Branover | G06F 1/3203 |
| | | | | 713/323 |
| 2019/0346303 | A1* | 11/2019 | Kroll | G01G 19/027 |

* cited by examiner

DYNAMIC POWER CONSUMPTION MANAGEMENT AND WAKE-UP METHOD AND APPLICATION SYSTEM THEREFOR

CROSS-REFERENCE TO RELATED APPLICATIONS

This application claims the benefit of priority to Chinese patent application 201811082328.7, filed on 17 Sep. 2018, which is incorporated by reference as if fully recited herein.

TECHNICAL FIELD

The present invention relates to technology for dynamic power consumption self-management and adjustment and, particularly to a dynamic power consumption management and wake-up method and application system therefor.

BACKGROUND

The current power consumption management for a weighing system mainly achieves the purpose of energy saving by sleeping at an instrument side, while a sensor on a weighing platform does not enter a low power consumption mode, in which case, the system continues to maintain a relatively high proportion of power consumption. Therefore, this approach presents significant challenges for a system that needs to work for a long time with a battery. In addition, in a common multi-level sleep design, even if it is in the deepest level of sleep, a CPU is only in a deep sleep state due to the need of wake-up depending on an external operation, so that there is still a small amount of power consumption. At the same time, devices in a peripheral circuit of the system also maintain some power consumption due to being in a power-on state. These factors all lead to an increase in power consumption of the system during sleep and a significant reduction in an available time of a battery.

SUMMARY

For those skilled in the art, the above and other objects, features and advantages of the present invention will become apparent from a detailed description of the method of the present invention as described below with reference to the accompanying drawings.

An object of the present invention is to significantly improve the lifetime of a battery of a system under the condition that the battery capacity is constant and overcome the shortcoming that the existing power consumption management solutions still have non-negligible power consumptions when the system is in a sleep mode, and to provide a dynamic power consumption management and system wake-up method by using a design of a combination of hardware and software.

In order to achieve the above-mentioned objects, the present invention provides a dynamic power consumption management and wake-up method, which is applied to a system consisting of a wireless weighing platform, characterized by comprising:

step 1, initialization, comprising setting a shallow sleep period and a deep sleep period;

step 2, entering a normal operating state, and starting shallow sleep timing;

step 3, if there is no weighing operation being detected and the shallow sleep period has not expired, continuing to detect the weighing operation; and if there is no weighing operation being detected and the shallow sleep period has expired, the wireless weighing platform entering a shallow sleep state, turning off a communication function of the wireless weighing platform, and starting timing for the deep sleep period;

step 4, if there is still no weighing being detected and the deep sleep period has expired, the wireless weighing platform entering a deep sleep state, and turning off power supply other than that for an acceleration sensor; and step 5, in the deep sleep state when the acceleration sensor detects an effective vibration, starting the normal operating state of the wireless weighing platform.

Preferably, the present invention further provides a dynamic power consumption management and wake-up method, characterized in that the steps 3 and 4 further comprise:

if the weighing operation is detected, resetting the timing for the shallow sleep period, and returning to step 2.

Preferably, the present invention further provides a dynamic power consumption management and wake-up method, characterized in that before entering the deep sleep state, the step 4 further comprises:

step 41, setting a vibration detection parameter range for the acceleration sensor; and the step 5 further comprises:

the acceleration sensor determining whether the detected vibration exceeds the vibration detection parameter range, and if so, the vibration being considered to be the effective vibration, and if not, the vibration being not considered to be the effective vibration.

Preferably, the present invention further provides a dynamic power consumption management and wake-up method, characterized in that the shallow sleep period and the deep sleep period are set according to a frequency of actual weighing operations.

The present invention further provides an application system, comprising any one of the above dynamic power consumption management and wake-up methods, characterized in that the application system comprises:

a weighing sensor for sensing and obtaining a weighing parameter;

a wireless module for transmitting the weighing parameter, the wireless module sleeping in both the shallow sleep state and the deep sleep state; and a weighing platform mainboard, further comprising:

a processor for receiving and processing the weighing parameter provided by the weighing sensor, and providing the weighing parameter to the wireless module for transmission;

an acceleration sensor for sensing and obtaining a vibration parameter in the deep sleep state, and when detecting an effective vibration, starting the normal operating state of the wireless weighing platform; and a control module for controlling operating states of the processor, the weighing sensor, and the wireless module according to the two sleep states.

Preferably, the present invention further provides an application system, characterized in that in the shallow sleep state, the processor turns off the wireless module via the control module, and in the deep sleep state, the acceleration sensor runs independently of the processor to detect a vibration state.

Preferably, the present invention further provides an application system, characterized in that the control module further comprises:

a switch circuit electrically connected to a power supply unit; and a system power control module electrically connected to the switch circuit to control the turning on and off of the wireless module, the weighing sensor and the processor.

Preferably, the present invention further provides an application system, characterized in that the system further comprises:

an A/D module, which is arranged between the weighing sensor and the processor and controlled by the system power control module, for converting and transmitting the weighing parameter to the processor.

Preferably, the present invention further provides an application system, characterized in that the acceleration sensor starting the normal operating state of the wireless weighing platform comprises: sending a control signal to the control module, wherein the control signal conducts the power supply unit to the system power control module via the switch circuit to supply power for the weighing platform mainboard, the weighing sensor and the wireless module.

The present invention reduces the power consumption of the entire system to a largest extent. In view of the shortcoming of the existing system power consumption management solutions, an idea of using hierarchical power consumption management is proposed, which adopts an approach where after entering the deep sleep state, the system power is cut off, the whole system is waken up only by means of an independent operating acceleration sensor detecting a vibration, so as to achieve effects of extremely low power consumption and optimal energy saving. This method has a general applicability and has no requirement for the power consumption level of an original system, thus fulfilling the requirement for reducing the power consumption to the largest extent.

BRIEF DESCRIPTION OF THE DRAWINGS

Embodiments of the present disclosure will now be described in detail with reference to the accompanying drawings. Reference will now be made in detail to preferred embodiments of the present disclosure, examples of which are illustrated in the accompanying drawings. The same reference numerals used in all the figures denote identical or similar parts wherever possible. Furthermore, although the terms used in the present disclosure are selected from well-known common terms, some of the terms mentioned in the description of the present disclosure may have been selected by the applicant according to his or her judgement, and the detailed meaning thereof is described in the relevant section described herein. Furthermore, the present disclosure must be understood, not simply by the actual terms used but also by the meanings encompassed by each term.

For those skilled in the art, the above and other objects, features and advantages of the present invention will become apparent from a detailed description of the present invention as described below with reference to the accompanying drawings.

DETAILED DESCRIPTION OF EMBODIMENTS

This description discloses one or more embodiments in combination with features of the present invention. The disclosed embodiments are merely illustrative of the present invention. The scope of the present invention is not limited to the disclosed embodiments. The present invention is defined by the appended claims.

The "one embodiment", "an embodiment", and "an exemplary embodiment", etc., referred in the description indicates that the described embodiment may comprise special features, structures or characteristics, however, all the embodiments do not necessarily contain such special features, structures, or characteristics. Furthermore, these phrases do not need to involve the same embodiments. Furthermore, when describing special features, mechanisms, or characteristics in combination with an embodiment, it is considered that the implementation of such features, mechanisms, or characteristics in combination with other embodiments (whether explicitly described or not) is well within the knowledge scope of those skilled in the art.

Furthermore, it should be understood that the space descriptions used herein (e.g., over, under, above, left, right, below, top, bottom, vertical, horizontal, etc.) are for illustrative purposes only, and the actual implementation of the structures described herein can be spatially arranged in any orientation or manner.

Figure 1:
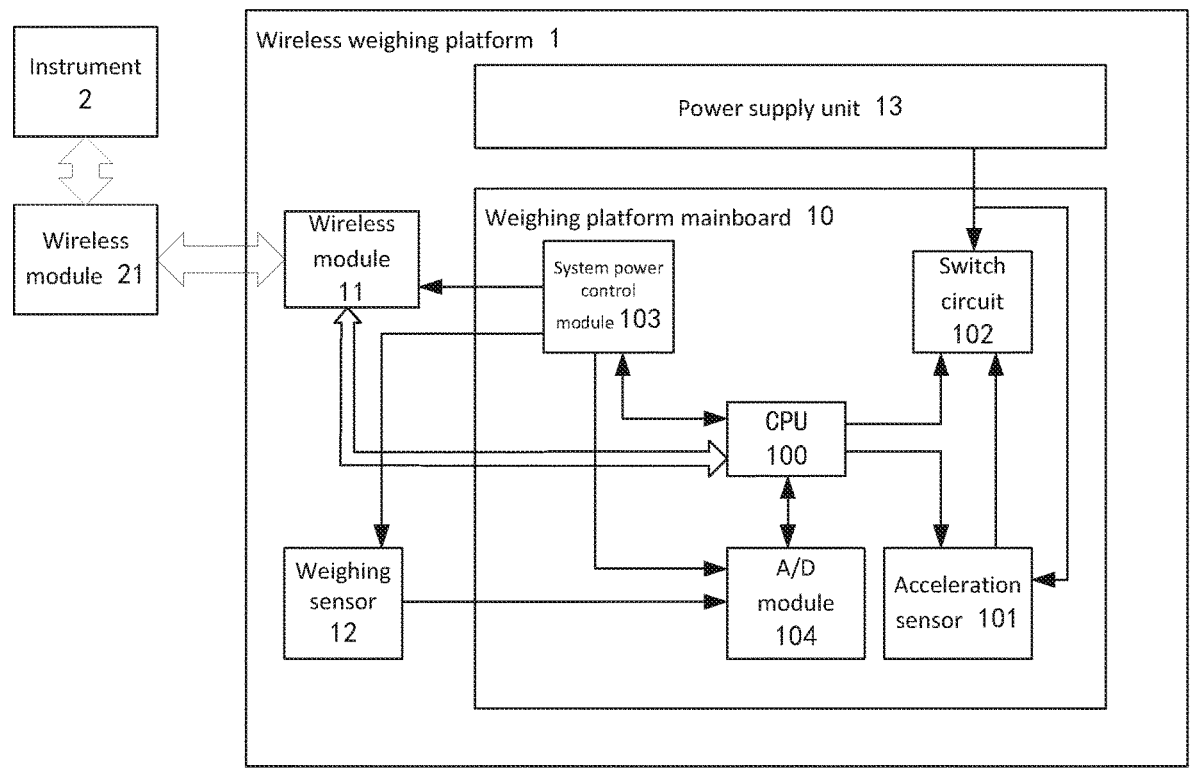
FIG. 1 is a component block diagram of an application system for a dynamic power consumption management and wake-up method of the present invention.

With reference to FIG. 1, the application system for the dynamic power consumption management and wake-up method of the present invention consists of two parts, namely, a wireless weighing platform 1 and an instrument 2. The wireless weighing platform 1 comprises four components belonging to the conventional compositions, i.e., the weighing platform mainboard 10, the wireless module 11, the weighing sensor 12 and the power supply unit 13, wherein the wireless module 11, the weighing sensor 12 and the power supply unit 13 are all conventional structures.

The power supply unit 13 can be powered via a battery or an external 220V power supply.

The improvements of the weighing system of the present invention in terms of the hardware structure lie in that: the wireless module 11 is located inside the wireless weighing platform 1, but is externally placed on the weighing platform mainboard 10, and is connected to the weighing platform mainboard 10 via a serial communication interface, that is, in data transmission with a CPU 100 in the weighing platform mainboard 10. Furthermore, at one end of the instrument 2, the wireless module 21 is also externally placed on the instrument 2, and is connected to the instrument 2 via the serial communication interface. The wireless module 11 in the above wireless weighing platform 1 and the wireless module 21 in the instrument 2 communicate with each other by means of low power consumption Bluetooth for data transmission.

The weighing platform mainboard 10 comprises the CPU 100, a system power control module 103 and an A/D module 104. Another important improvement of the present invention lies in that an acceleration sensor 101 and a switch circuit 102 are further arranged in the mainboard 10.

It is further understood that the power supply unit 13 supplies power to the switch circuit 102, wherein the switch circuit 102 performs switch control for the control of operating power of the system power control module 103, in other words, the switch circuit 102 controls the system power control module 103 to supply power to the wireless module 11, the weighing sensor 12, the CPU 100, and the A/D module 104, etc., and the CPU 100 can further control the acceleration sensor 101 and the switch circuit 102, and the acceleration sensor 101 can also control the switch circuit 102. It is important that the acceleration sensor 101 is not controlled by the switch circuit 102 and is directly powered by the power supply unit 13.

Figure 2:
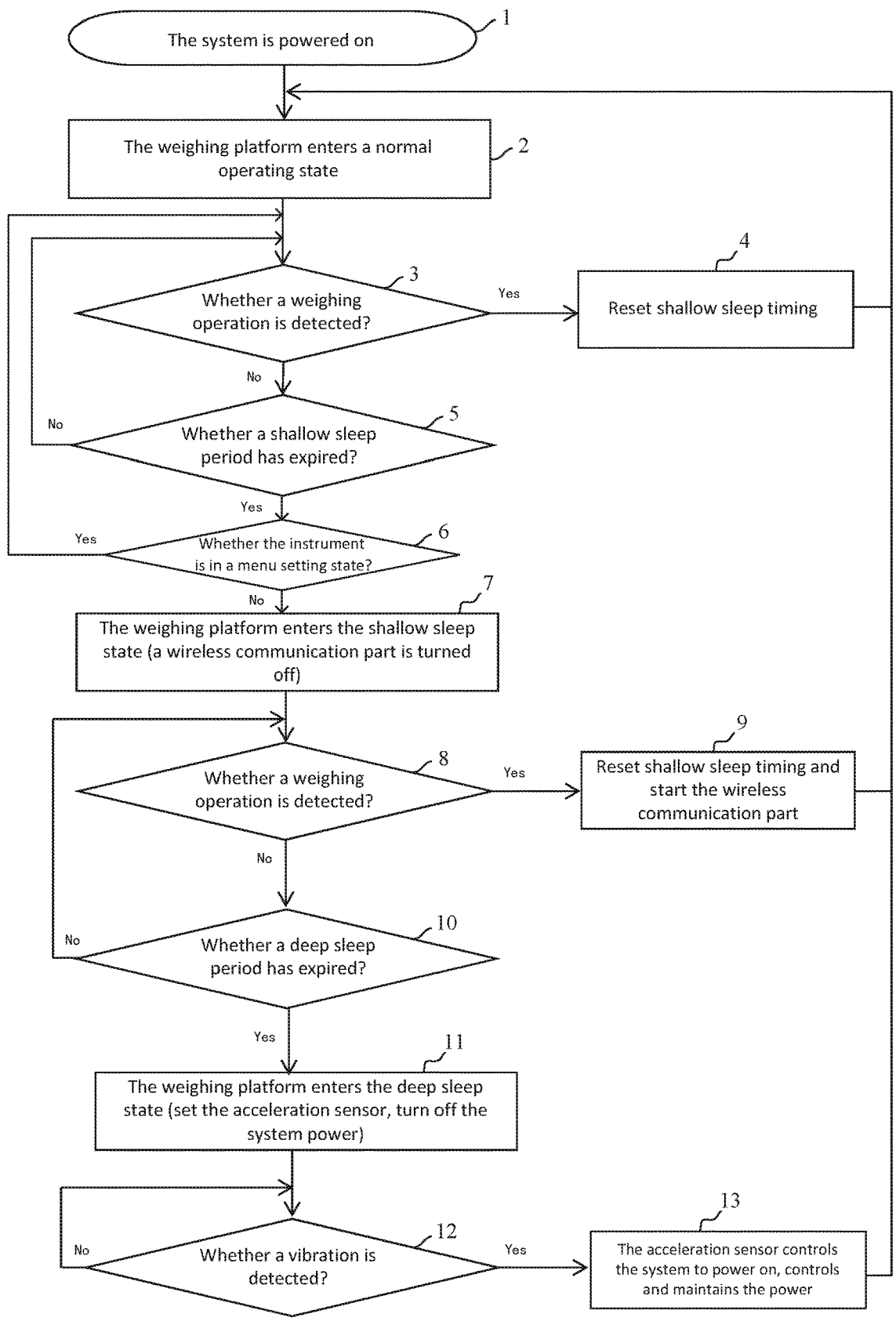
FIG. 2 is a flow chart of a dynamic power consumption management and wake-up method applied in the system of FIG. 1.

An operating process of the dynamic power consumption management and wake-up method of the present invention is introduced in conjunction with an operating flow chart shown in FIG. 2.

In Step 1, the system is powered on and initialized, and after being powered on, the system enters a normal operating state, and various system components are in a normal power consumption state of full speed operation. The initialization process comprises arranging, by the CPU 100, the system to enter the shallow sleep period and the deep sleep period according to the frequency of the user actually performing the weighing operations. For example, if the user performs weighing once every 5 minutes and works 8 hours a day, the shallow sleep period can be set to be 2 minutes and the deep sleep period to be 30 minutes. In this way, about 60% of normal operating time is in the shallow sleep state, and if there is no weighing operation performed for a long time or no operation is performed during night, the wireless weighing platform 1 enters the deep sleep state in which energy is saved to the largest extent.

After initialization, the wireless module 11, the weighing sensor 12 and the weighing platform mainboard 10 of the wireless weighing platform 1 are all in an operating state.

In Step 2, the wireless weighing platform 1 enters the normal operating state, and the shallow sleep timer starts timing.

In Step 3, it is determined whether a weighing operation is detected.

Specifically, the CPU 100 determines whether a weighing operation has occurred by detecting changes in an output signal of the weighing sensor 12 arranged on the wireless weighing platform 1 output through the A/D module 104, and if so, the process turns to step 4; and if not, the process jumps to step 5.

In Step 4, if there is a weighing operation, no sleep operation is performed and the shallow sleep timing is reset, that is, the shallow sleep timer is set to zero, and then the process returns to step 2.

In Step 5, if step 3 detects that there is no weighing operation, the process continues the shallow sleep timing, and if the shallow sleep timing does not reach a predetermined value, the process returns to step 3 to continuously repeat the detection of whether there is a weighing operation.

In Step 6, if the wireless weighing platform 1 performs no weighing operation in step 3, and the shallow sleep timing reaches the determined value, for example, reaches 2 minutes in the above example, then it is determined whether the instrument 2 is in a menu setting state, and if so, the instrument 2 will not allow the weighing platform 1 to enter sleeping, and the process turns to step 3; and if not, the process turns to step 7.

In Step 7, on the premise that the shallow sleep period has expired and the instrument 2 is not in the menu setting state, the wireless weighing platform 1 enters the shallow sleep state.

As shown in FIG. 1, in this step, the CPU 100 on the weighing platform mainboard 10 does not detect changes in a signal transmitted via the A/D module 104 by the weighing sensor 12 in the wireless weighing platform 1, and the CPU 100 issues to the switch circuit 102 an instruction by which the circuit 102 turns off the power supply to the wireless module 11, via the system power control module 103, and then turns off the wireless communication function of the wireless module 11; and in addition, the CPU 100 also starts the deep sleep timer to start timing at this time. In the shallow sleep state, the wireless module 11 of the weighing platform 1 is turned off, the communication with the instrument 2 is interrupted, but other modules of the weighing platform mainboard 10, including the CPU 100, the acceleration sensor 101, the switch circuit 102, the system power control module 103, and the A/D module 104, are still working.

In Step 8, the CPU 100 continues to determine whether there is a weighing operation by detecting changes in the output signal for weighing by the weighing sensor 12 output via the A/D module 104.

In Step 9, if in step 8 the CPU 100 on the weighing platform mainboard 10 detects changes in a weight signal of the weighing sensor 12 via the A/D module 104, it indicates that the weighing operation is detected, and then the system power control module 103 starts the power supply for the wireless module 11, the wireless weighing platform 1 quickly recovers the communication with the instrument 2 and uploads related weighing data to the instrument 2 via the wireless module 11, and at the same time, resets the shallow sleep timing, that is, sets the shallow sleep timer to zero, and then returns to the normal operating state of step 2.

In Step 10, if there is no weighing operation being detected in step 8, it is further determined whether the deep sleep time is reached, in other words, it is determined whether the deep sleep period that starts timing in step 7 is reached, if not, the process returns to step 8 to continue to determine whether the wireless weighing platform 1 performs a weighing operation; and if so, the process enters the next step.

In Step 11, when the deep sleep period has expired, for example, there is no weighing operation being detected and the deep sleep period of 30 minutes has expired, the system enters the deep sleep state.

In the deep sleep state, the CPU 100 on the weighing platform mainboard 10 controls via the switch circuit 102 the system power control module 103 to turn off the power supply for various modules, except the acceleration sensor 101, including the CPU 100, the switch circuit 102, the system power control module 103, and the A/D module 104, and at this time, the power consumption of the entire system is only that of the acceleration sensor 101.

It can be understood from the foregoing process steps that the wireless weighing platform 1 will directly enter the deep sleep state when the conditions of the shallow sleep state, no weighing operation, and a duration reaching the deep sleep period are fulfilled. In the process of entering the deep sleep state, the mainboard CPU 100 of the wireless weighing platform 1 first initializes the acceleration sensor 101 on the mainboard 10 and sets the vibration detection parameter, and then turns off power supply for the weighing platform mainboard 10 itself and for the weighing sensor 12 by using the switch circuit 102. In this way, in the entire system, only the acceleration sensor 101 operates independently with the power supply of the power supply unit 13, other modules including the CPU 100, the switch circuit 102, the system power control module 103, and the A/D circuit 104, and the wireless module 11 and the weighing sensor 12 are all in a power-off state, and the operating current of the entire system is significantly reduced from a few hundred milliamps to a microampere level, thereby reducing the power consumption of the system to a largest extent.

In this state, the system is almost in a shut-down state, and the acceleration sensor 101 is in a low power consumption operating state. In the above steps, the CPU 100 sets a vibration detection parameter for the acceleration sensor 101 before turning off the system power, and the process is specifically as follows: the CPU 100 writes the vibration detection parameter into the acceleration sensor 101 before turning off the system power control module 103 via the switch circuit 102, and determines whether the received vibration exceeds the range of the parameter when the acceleration sensor 101 operates independently, if so, determines that the vibration is an effective vibration, and if not, determines that the detected vibration is a sshallow vibration which does not serve as a normal effective weighing vibration. The output signal of the acceleration sensor 101 is connected to the switch circuit 102. After the effective weighing vibration is detected, the output signal controls the switch circuit 102 to access the power from the power supply unit 13, and starts other modules in the weighing platform mainboard 10 via the system power control module 103.

In Step 12, in the deep sleep state, the acceleration sensor 101 detects a vibration state, and if no vibration is detected, the process continues to return to step 12, to perform cycle detections, and once an effective weighing vibration is detected, the process turns to the next step 13.

In Step 13, once the acceleration sensor 101 detects that a vibration occurs and changes in the signal resulting from the vibration exceeds the vibration detection parameter set by the CPU 100, that is, in the case of indicating that the vibration is an effective weighing vibration, the acceleration sensor 101 will output a control signal to the switch circuit 102, so as to directly turn on the system power. When the weighing system is in the deep sleep state, and if the weighing operation occurs, in which an operator puts a weight on the weighing platform 1, causing a vibration of the weighing platform 1, the acceleration sensor 101 detects the vibration of the wireless weighing platform 1 and then sends a control signal, wherein the control signal turns on, via the switch circuit 102, the power from the power supply unit 13 to the system power control module 103, so as to supply power to the weighing platform mainboard 10, the weighing sensor 12 and the wireless module 11.

It can be understood from the above entire process that the dynamic power consumption management and wake-up method of the present invention is controlled by the switch circuit 102 from two aspects: on the one hand, in a shallow sleep state, the CPU 100 controls the switch circuit 102 to control the turning on and off of the system power control module 103; and on the other hand, in the deep sleep state of the system, the switch circuit 102 is directly controlled by the output signal of the acceleration sensor 101. In a previous aspect, after being powered on for operation, the CPU 100 of the weighing platform mainboard 10 controls the switch unit 102 via software, maintains the power supply unit 13 to supply power to the system power control module 103 via the switch circuit 102, and then the module 103 supplies power to other modules of the weighing platform mainboard 10, that is, the weighing sensor 12 and the wireless module 11.

At the same time, the CPU 100 instructs the acceleration sensor 101 to revoke the control of the switch circuit 102 in the deep sleep state to allow the system to control the self-turn-off the next time when it is ready to enter the deep sleep state. After powering on, the system re-enters the normal operating state.

The above-mentioned power consumption management approach in a combination of hardware and software can thoroughly control the power consumption of the whole system to be at a very low level during deep sleep, instead of mainly controlling the operating state of the CPU in a conventional system, which ignores the power consumption of other parts of the system. In the process of wake up, the characteristics of the system operation are skillfully utilized, and the system is directly waken up by the vibration resulting from the weighing operation without increasing the operation steps. The switch circuit 102 therein is a critical part. This circuit can be controlled by the system CPU to realize the function of turning off the power supply for the system itself, or can also be directly controlled by the output signal of the acceleration sensor 101 for powering on the system. The acceleration sensor 101 is directly powered by the power supply unit 13, and can independently operate to detect vibration when the system power is turned off. A data line of the acceleration sensor 101 is connected to the CPU 100, and once the system recovers power-on, the CPU 100 quickly controls the switch circuit 102 to maintain the power and resets the output signal of the acceleration sensor 101, and the system enters the next cycle from normal operation to sleep.

In summary, the present invention employs a hardware/software co-design to reduce the power consumption of the entire system to a largest extent. In view of the shortcoming of the existing system power consumption management solutions, an idea of using hierarchical power consumption management is proposed, which adopts an approach where after entering the deep sleep state, the system power is cut off, the weighing platform mainboard 10, the wireless module 11 and the weighing sensor 12 all stop operating, the whole system is waken up only by means of an independent operating acceleration sensor 101 detecting a vibration, so as to achieve effects of extremely low power consumption and optimal energy saving. This method has a general applicability and has no requirement for the power consumption level of an original system, thus fulfilling the requirement for reducing the power consumption to the largest extent.

According to the above technical solutions of the present invention, the lifetime of the battery of the system is greatly improved without changing the existing system structure and the weighing sensor parameters (still using a commonly used sensor having 350 ohm impedance instead of a high resistance sensor), and calculated according to the normal daily operating hours of 8 hours a day, the lifetime of the battery of the new solution is increased to 20 times of that of the original solution. In the original solution, the battery can be used for 20 days, while in the new solution, the battery can be used for more than 400 days.

The previous description of the preferred embodiments is provided to enable any person skilled in the art to use or utilize the present invention. Various modifications to these embodiments would be obvious to a person skilled in the art, and the general principles described herein can be applied to other embodiments without involving inventiveness. Thus, the present invention is not limited to the embodiments shown herein, but is based on the broadest scope complying with the principles and novel features disclosed herein.

What is claimed is:

1. A method of dynamic power consumption management and a wake-up method, as applied to a wireless weighing platform, comprising the steps of:
   initializing, including the substeps of setting a light sleep period and a deep sleep period;
   entering a normal operating state, by at least powering the wireless weighing platform, including a wireless module, starting a timer for the light sleep period, and determining whether a weighing operation is being detected by detecting changes in an output signal of a weighing sensor;
   while the wireless weighing platform is in the normal operating state, determining that the weighing operation is being detected by detecting changes in the output signal of the weighing sensor and wirelessly transmitting weight reading data from the weighing sensor to a remote instrument by way of the wireless module, and resetting the timer for the light sleep period;

while the wireless weighing platform is in the normal operating state, determining that no weighing operation is being detected by detecting no changes in the output signal of the weighing sensor and that the light sleep period has not expired, and returning to and repeating the step of determining whether the weighing operation is being detected;

while the wireless weighing platform is in the normal operating state, determining that no weighing operation is being detected by detecting no changes in the output signal of the weighing sensor and that the light sleep period has expired, and causing the wireless weighing platform to enter a light sleep state, by at least turning off the wireless module of the wireless weighing platform, and starting a timer for the deep sleep period;

while the wireless weighing platform is in the light sleep state, determining that the weighing operation is being detected by detecting changes in the output signal of the weighing sensor, and activating the wireless module, resetting the timer for the light sleep period, and returning to the step of entering the normal operating state;

while the wireless weighing platform is in the light sleep state, determining that no weighing operation is being detected by detecting no changes in the output signal of the weighing sensor and that the deep sleep period has expired, and causing the wireless weighing platform to enter a deep sleep state, by at least turning off power supply except the power supply for an acceleration sensor; and while the wireless weighing platform is in the deep sleep state, determining that the acceleration sensor detects an effective vibration while the wireless weighing platform is in the deep sleep state, and returning to the step of entering the normal operating state.

2. The method of claim 1, further comprising the steps of:
before the step of causing the wireless weighing platform to enter into the deep sleep state, setting a vibration detection parameter range for the acceleration sensor, wherein the effective vibration is set to the vibration detection parameter range.

3. The method of claim 2, wherein
the settings of the respective light and deep sleep periods are determined according to a frequency of actual weighing operations.

4. The method of claim 1, comprising the further step of:
while the wireless weighing platform is in the normal operating state and a determination is made that no weighing operation is being detected and that the light sleep period has expired, preventing the wireless weighing platform from entering the light sleep state and instead maintaining the wireless weighing platform in the normal operating state where a menu setting state of the remote instrument is active.

5. An application system providing a dynamic power consumption management and wake-up feature, the application system comprising:
a wireless weighing platform having a weighing sensor for sensing and obtaining a weighing parameter, a power supply unit, a wireless weighing platform mainboard, and a slave wireless module;

an instrument; and
a master wireless module connected with the instrument for communication;
wherein the slave wireless module is configured to transmit the weighing parameter to the instrument through the master wireless module, wherein the slave wireless module is configured to enter a light sleep state and a deep sleep state;
wherein the weighing platform mainboard comprises:
a central processing unit (CPU) configured to receive and process the weighing parameter provided by the weighing sensor, and provide the weighing parameter to the slave wireless module for transmission;
an acceleration sensor configured to sense and obtain a vibration parameter while the wireless weighing platform remains in the deep sleep state, and when sensing an effective vibration, initiating a normal operating state of the wireless weighing platform; and
a control module for controlling, according to the light and deep sleep states, the operating states of the CPU, the weighing sensor, and the slave wireless module;
wherein the CPU is configured to apply the dynamic power consumption management and the wake-up features to the wireless weighing platform, by at least:
initializing the features, including setting a light sleep period and a deep sleep period;
entering a normal operating state, including powering the wireless weighing platform, including the slave wireless module, starting a timer for the light sleep period, and determining whether a weighing operation is being detected by detecting changes in an output signal of the weighing sensor;
wherein weighing operation is detected while the wireless weighing platform is in the normal operating state, resetting the timer for the light sleep period;
if no weighing operation is being detected and if the light sleep period has not expired, returning to and repeating the step of determining the weighing operation;
if no weighing operation is being detected and if the light sleep period has expired, causing the wireless weighing platform to enter a light sleep state, by at least turning off a communication function of the slave wireless module, and starting a timer for the deep sleep period;
wherein weighing operating is detected while the wireless weighing platform is in the light sleep state by changes to the output signal of the weighing sensor, causing the wireless weighing platform to exit the light sleep state and instead enter the normal operating state;
if no weighing operation is being detected and if the deep sleep period has expired, causing the wireless weighing platform to enter a deep sleep state, by at least turning off power supply from the power supply unit other than to the acceleration sensor; and
if the acceleration sensor detects an effective vibration while the wireless weighing platform is in the deep sleep state, returning to the step of entering the normal operating state.

6. The application system of claim 5, wherein:
during the light sleep state, the CPU turns off the slave wireless module via a system power control module; and during the deep sleep state, the acceleration sensor runs independently of the CPU to detect a vibration state.

7. The application system of claim 6, further comprising, in the control module:
a switch circuit electrically connected to the power supply unit;
wherein the system power control module is electrically connected to the switch circuit to control the supply of power to the slave wireless module, the weighing sensor and the CPU.

8. The application system of claim 7, further comprising:
an analog-to digital (A/D) module, which is arranged between the weighing sensor and the CPU and controlled by the system power control module, for converting and transmitting the weighing parameter to the CPU.

9. The application system of claim 8, wherein:
to start the normal operating state of the wireless weighing platform, the acceleration sensor sends a control signal to the control module, wherein the control signal connects the power supply unit to the system power control module via the switch circuit to supply power for the weighing platform mainboard, the weighing sensor and the slave wireless module.

10. The application system of claim 5 wherein:
the CPU is configured to apply the dynamic power consumption management and the wake-up features to the wireless weighing platform, by further preventing the wireless weighing platform from entering the light sleep state and instead maintain the wireless weighing platform in the normal operating state where the instrument is determined to be in a menu setting state.

* * * * *

UNITED STATES PATENT AND TRADEMARK OFFICE
CERTIFICATE OF CORRECTION

| | | |
|---|---|---|
| PATENT NO. | : 11,669,147 B2 | Page 1 of 1 |
| APPLICATION NO. | : 16/571276 | |
| DATED | : June 6, 2023 | |
| INVENTOR(S) | : Qian et al. | |

It is certified that error appears in the above-identified patent and that said Letters Patent is hereby corrected as shown below:

On the Title Page

Item (56) References Cited, U.S. Patent Documents, please delete "3,041,974 A1 10/2011 Lin et al." and insert -- 8,041,974 B2 10/2011 Lin et al. --.

In the Claims

In Column 10, Line 35, please delete "wherein" and insert -- where --.

In Column 10, Line 48, please delete "wherein weighing operating" and insert -- where weighing operation --.

Signed and Sealed this
Ninth Day of April, 2024

Katherine Kelly Vidal
*Director of the United States Patent and Trademark Office*